(12) United States Patent
Fukuta

(10) Patent No.: US 6,507,876 B1
(45) Date of Patent: Jan. 14, 2003

(54) DETECTING APPARATUS

(75) Inventor: Hiroshi Fukuta, Yokohama (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/394,037

(22) Filed: Sep. 13, 1999

(30) Foreign Application Priority Data

Dec. 3, 1998 (JP) .......................................... 10-344186

(51) Int. Cl.$^7$ ................................................. G06F 3/00
(52) U.S. Cl. .............................. 710/51; 710/30; 710/33; 348/266; 348/318
(58) Field of Search ............................ 710/51, 30, 33; 348/266, 318, 324

(56) References Cited

U.S. PATENT DOCUMENTS

| | | | | |
|---|---|---|---|---|
| 4,875,099 A | * | 10/1989 | Sakai et al. | .................. 358/471 |
| 5,003,380 A | * | 3/1991 | Hirota | ......................... 358/461 |
| 5,831,723 A | * | 11/1998 | Kubota et al. | ................. 356/23 |
| 6,282,669 B1 | * | 8/2001 | Imanaka et al. | ............. 370/221 |
| 6,334,175 B1 | * | 12/2001 | Chih | ........................... 710/51 |

* cited by examiner

Primary Examiner—Jeffrey Gaffin
Assistant Examiner—Harold Kim
(74) Attorney, Agent, or Firm—Pillsbury Winthrop LLP

(57) ABSTRACT

A plurality of sensor portions detect a variety of physical characteristics of objects to be detected, which are being conveyed on a conveyance passage to asynchronously transmit electric signals indicating results of detection to a processing unit. The processing unit causes an A/D converter to A/D-convert the electric signals transmitted from the sensor portions. A mixer adds, to data, an identifier indicating the sensor portion from which data has been transmitted to sequentially output data for each of the sensor portions. A detection-result processing means receives data output from the mixer to identify the sensor portion from which data has been transmitted in accordance with the identifier contained in received data so as to perform a process for detecting the variety of the physical characteristics. The structure and circuit structure of the transmission passage in the detecting apparatus can be simplified.

5 Claims, 15 Drawing Sheets

DETECTING APPARATUS

BACKGROUND OF THE INVENTION

The present invention relates to a detecting apparatus for detecting a variety of physical characteristics of objects to be detected, which are conveyed on a conveyance passage.

Hitherto, in order to detect a plurality of physical characteristics of objects to be detected, a plurality of sensor portions are disposed on a conveyance passage in a detecting apparatus for detecting a variety of physical characteristics of objects to be detected, which are conveyed on the conveyance passage.

Objects to be detected are individually conveyed on a conveyance passage in such a detecting apparatus. Sensors disposed on the conveyance passage and capable of detecting required physical characteristics of the objects to be detected are selected. Since a plurality of physical characteristics of objects to be detected are required to be detected in usual, a variety of sensors for detecting the plural physical characteristics are interspersed over the conveyance passage. The physical characteristics of the objects to be detected, detected by the sensor portions are formed into electric signals. Then, the electric signals are transmitted to processing units through transmission passages. Each processing unit subjects the electric signals transmitted from the sensor portions to a process for detecting the physical characteristics of the objects to be detected. After all of the processes for detecting the physical characteristics have been completed, the processing unit totally determines results of the detection so as to produce a predetermined output to an output portion.

FIG. 18 is a diagram showing an example of the structures of the sensor portion and the processing unit of the conventional detecting apparatus. As shown in FIG. 8, the physical characteristics of the objects to be detected, which have been detected by the sensors of the sensor portions, are converted into electric signals. Then, the electric signals are amplified by amplifiers, and then, through the transmission passages (in general, long coaxial cables), transmitted to the processing units disposed to correspond to the sensor portions.

Each processing unit causes an A/D converter to convert the electric signal transmitted from the sensor portion into digital data. A detection-result processor processes results of the detection so as to store the results of the detection in a common memory. A central processing unit reads the results of detection. The central processing unit analyzes the results of the detection so as to output a signal for instructing a predetermined operation to an output portion. A data collector is used when data processed by each processing unit is collectively collected.

The detecting apparatus having the foregoing conventional structure, however, requires the transmission passages (harnesses) which establish the connection between the sensor portions and the processing units corresponding to the sensor portions. Therefore, a multiplicity of the transmission passages must be provided for the inside of the detecting apparatus.

Electric signals are transmitted from the plural sensor portions in an asynchronous manner and the data transmission rates of the electric signals are different from one another. Hence it follows that the sensors require individual processing hardware. Therefore, the structure of the processing unit becomes complicated.

Further, the data collector to collect data must be provided for each processing unit. What is worse, collection of data for identifying objects to be detected cannot easily be performed.

BRIEF SUMMARY OF THE INVENTION

An object of the present invention is to provide a detecting apparatus with which the structures of transmission passages for connecting a plurality of sensor portions and processing units and the transmission passage in each processing unit can be simplified.

Another object of the present invention is to provide a detecting apparatus with which a portion of a plurality of processing hardware systems for processing electric signals which are asynchronously transmitted from a plurality of sensor portions at different transmission rates can be made to be common structure and, therefore, the structure of each processing unit can be simplified.

Another object of the present invention is to provide a detecting apparatus structured such that only one data collector collects data about a variety of results detected asynchronously from a plurality of sensor portions, transmitted at different transmission rates, the collector being arranged to be capable of collecting data in units of each of objects to be detected, which are conveyed through the conveyance passage.

In order to achieve the above object, according to one aspect of the present invention, there is provided a detecting apparatus comprising: a plurality of detecting means for detecting a variety of physical characteristics of objects to be detected, which are being conveyed on a conveyance passage to output data indicating results of detection as electric signals; mixing means for receiving electric signals output from the detecting means, adding an identifier indicating the detecting means to data obtained by the plural detecting means and collectively and sequentially outputting data from each detecting means: and detection-result processing means for receiving data output from the mixing means, identifying the detecting means from which data has been obtained in accordance with the identifier contained in received data and processing results of detection of the various physical characteristics.

The plurality of detecting means incorporating means for outputting digital data indicating results of detection of the objects to be detected in response to sensor clocks asynchronous with each other, and the mixing means incorporating storage means for storing digital data output from each of the detecting means at periods of the sensor clocks and means for outputting data stored in the storage means in response to clocks, the transmission rate of each of which being higher than that of each of the sensor clocks.

Each of the detecting means incorporates means for detecting spaces among objects to be detected to output space detection signal, and wherein the detecting apparatus further comprises, determining means for determining the sequential order of conveyance of the objects to be detected in response to the space detection signal output from the detecting means to output serial numbers for identifying the objects to be detected, and data collecting means for adding the serial numbers output from the determining means to data sequentially output from the mixing means so as to collect data.

According to another aspect of the present invention, there is provided a detecting apparatus comprising: a plurality of detecting means for detecting a variety of physical characteristics of objects to be detected, which are being conveyed on a conveyance passage, to add identifiers indicating the detecting means from which data has been obtained to data indicating results of detection, each detecting means outputting a data items and incorporating timing control means for controlling output timing from the detecting means in such a manner that data items are successively output from the plurality of detecting means into the transmission passage, and detection-result processing means for receiving data output from detecting means through the transmission passage, identifying the detecting means from which data has been obtained in accordance with the identifier contained in received data and processing results of detection of the various physical characteristics.

The timing control means includes output control means for generating an output-enable signal from horizontal synchronizing signal indicating turnaround time of output of data from the plural detecting means and reference clock signal and means for temporarily storing data indicating results of detection and outputting data indicating results of detection in accordance with the output-enable signal supplied from the output control means and in response to the reference clock signal.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

An embodiment of the present invention will now be described with reference to the drawings.

Figure 1:
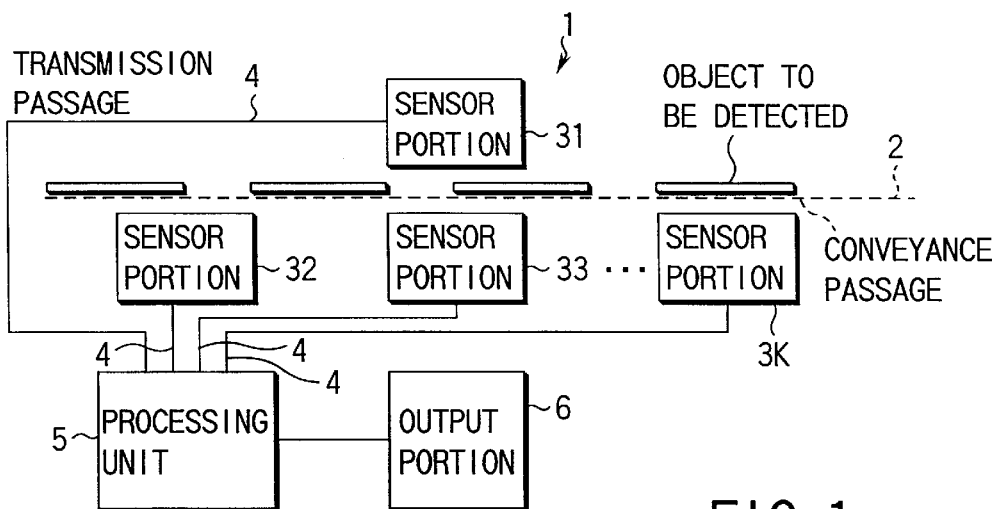
FIG. 1 is a diagram schematically showing the overall structure of a detecting apparatus according to an embodiment of the present invention.

FIG. 1 is a diagram showing the schematic structure of a detecting apparatus 1 for detecting a variety of physical characteristics of objects to be detected. The detecting apparatus 1 incorporates a conveyance passage 2 for individually conveying the objects to be detected; a plurality of sensor portions 31, 32, . . . , 3k (hereinafter referred to as "sensor portions 31") for detecting the various physical characteristics of the objects to be detected, which are conveyed on the conveyance passage 2; a processing unit 5 which is connected to the sensor portions 31 through a transmission passages 4 and to which the physical characteristics detected by the sensor portions 31 are transmitted as electric signals; and an output portion 6 which receives a result of a detection process performed by the processing unit 5 to output a result of detection to the outside.

The sensor portions 31 detect the physical characteristics of the objects to be detected, which are conveyed on the conveyance passage 2. Since a plurality of the physical characteristics of the objects to be detected must be detected, plural types of sensor portions 31 corresponding to the various physical characteristics to be detected are interspersed over the conveyance passage 2. The sensor portions 31 communicate the detected physical characteristics to the processing unit 5 by transmitting electric signals.

In response to the electric signals transmitted from the sensor portions 31 through the transmission passages 4, the processing unit 5 detects and determines the various physical characteristics of the plural objects to be detected. After the plural physical characteristics of the objects has detected, the processing unit 5 output results of detection through the output portion 6.

Figure 2:
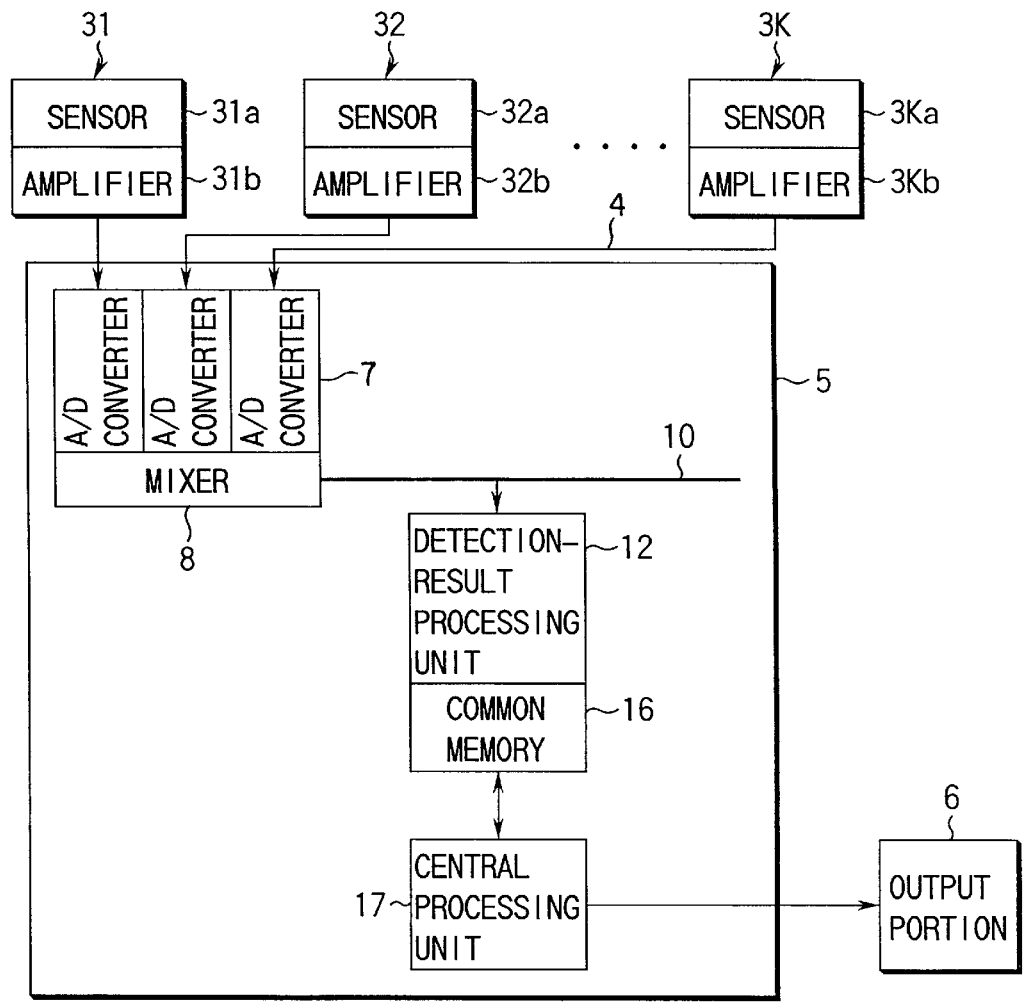
FIG. 2 is a block diagram showing example of the structures of sensor portions and processing units of the detecting apparatus.

FIG. 2 is a diagram showing examples of the structures of the sensor portions 31, 32, . . . , 3k and the processing unit 5 provided for the detecting apparatus.

As shown in FIG. 2, the various physical characteristics of the objects to be detected, which are being conveyed on the conveyance passage 2, are converted into analog electric signals by the sensors 31a of the sensor portions 31. The electric signals are amplified by amplifiers 31b, and then transmitted to the processing unit 5 through the connected transmission passages 4. In general, the transmission passages 4 are constituted by coaxial cables.

In the processing unit 5, A/D converters 7 convert the analog electric signals transmitted from the sensor portions 31 through the transmission passages 4 into digital signals. The digital signals output from the A/D converters 7 are asynchronous with one another because the electric signals obtained by the sensors 31a of the sensor portions 31 are asynchronous with one another. Therefore, the mixer 8 generates timing signals defined by horizontal-synchronizing signals and reference clocks. The mixer 8 uses the timing signal to output data to a detection-result processing unit 12 through a data bus 10. That is, the mixer 8 receives signals supplied from the sensor portions and converted into the digital signals and sequentially transmits the supplied data to the detection-result processing unit 12.

The detection-result processing unit 12 uses data transmitted from the mixer 8 through the data bus 10 to perform a variety of detection processes. After the detection processes have been completed, the detection-result processing unit 12 writes results of detection on a common memory 16 commonly used by the detection-result processing unit 12 and the central processing unit 17. The results of the detection are communicated to the central processing unit 17.

The central processing unit 17 analyzes the results of the detection of the various physical characteristics performed by the detection-result processing unit 12 to output a signal instructing a predetermined operation to the output portion 6.

Figure 3:
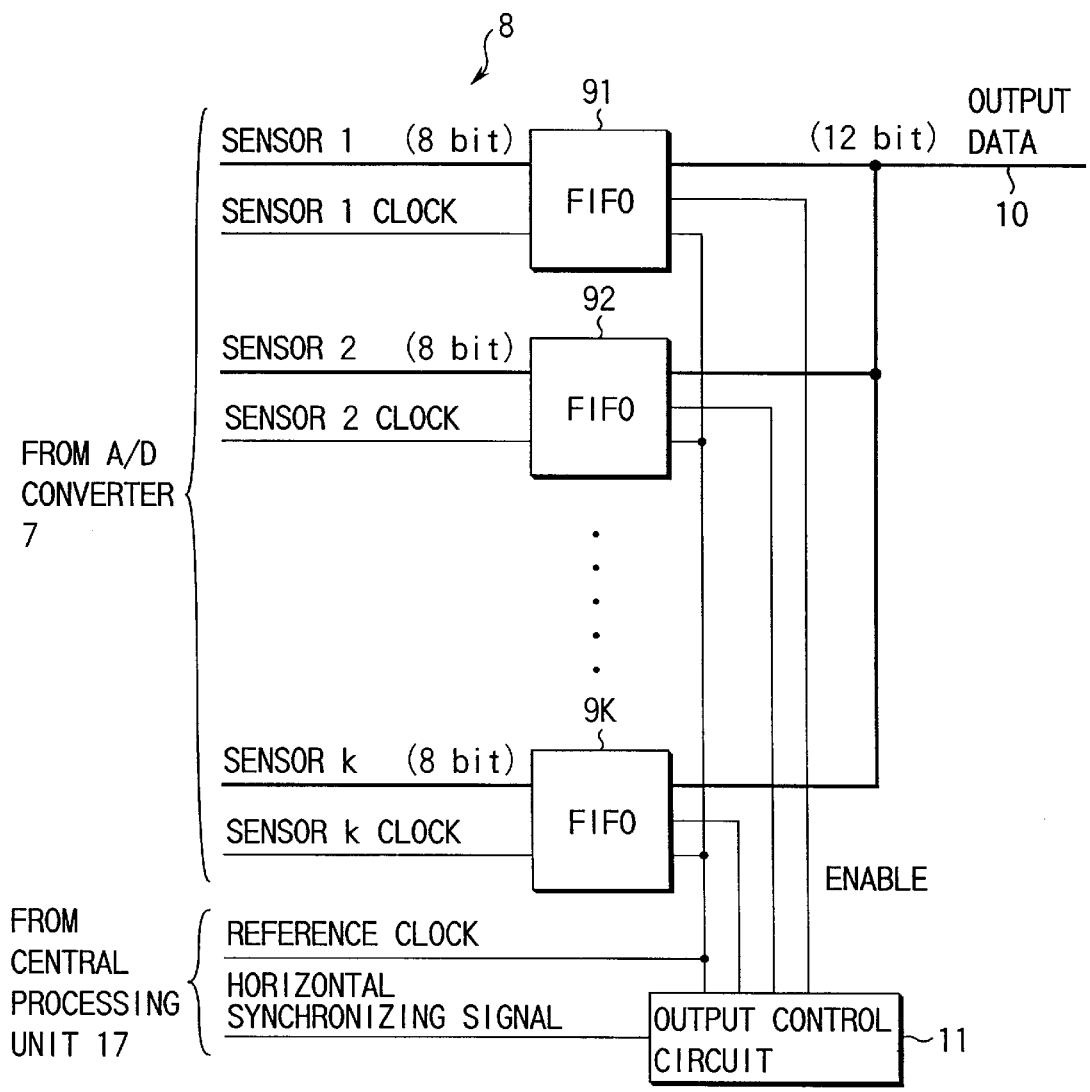
FIG. 3 is a block diagram showing the structures of mixers.

FIG. 3 is a diagram showing an example of the structure of a circuit in the mixer 8. The mixer 8 is constituted by FIFO memories 91, 92, ..., 9k each having a first-in first-out structure and an output control circuit 11. The FIFO memories 91, 92, ..., 9k are supplied with sensor data signals (sensor 1 to sensor k) and sensor clock signals (sensor 1 clock to sensor k clock) from the sensor portions 31 through the A/D converters 7. The FIFO memories 91, 92, ..., 9k (hereinafter referred to as "FIFO memories 91") sequentially store the sensor data signals in response to the sensor clocks. The output control circuit 11 generates an enable signal (ENABLE) in response to the reference clocks and the horizontal synchronizing signal supplied from the central processing unit 17. Data stored in the FIFO memories 91 is supplied to the data bus 10 in response to the enable signal and the reference clock signal.

Figure 4:
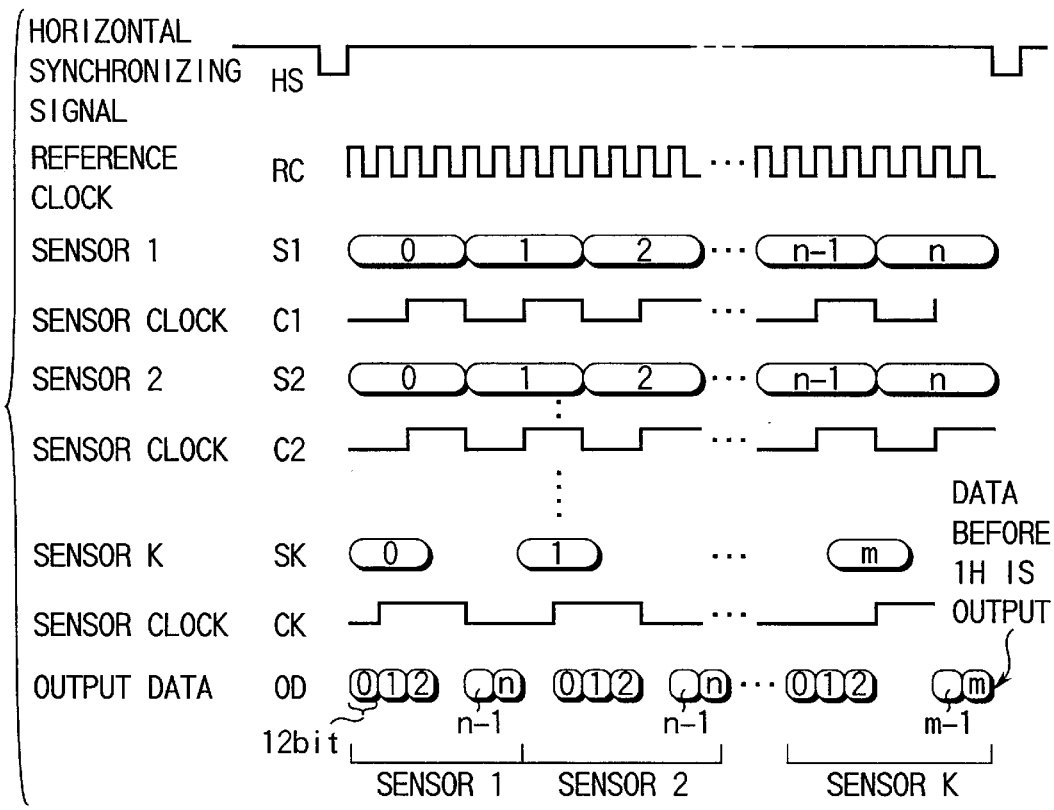
FIG. 4 is a timing chart showing the relationship among a horizontal synchronizing signal, a reference clock, input signals from sensors and output data.

FIG. 4 is a timing chart showing horizontal synchronizing signal HS which is supplied from the output control circuit 11 to the FIFO memories 91, reference clock RC supplied from the central processing unit 17, sensor data signals S1 to Sk converted into digital signal by the A/D converters 7 and supplied from the sensor portions (sensor portions 31, 32, ..., 3k), sensor clocks C1 to Ck, output data OD output from the FIFO memories 91 and ENABLE signal for the outputs.

The signals supplied from the sensor portions 31 and A/D converted as described above are supplied to the FIFO memories 91. The A/D converters 7 performs A/D-conversion at the periods of sensor clocks C1 to Ck. The sensor-data signals S1 to Sk supplied to the FIFO memories 91, are stored in the FIFO memories at the first transition of each of the sensor clocks C1 to Ck. The sensor data signals S1 to Sk are basically asynchronous with one another and transmitted at different rates. In this embodiment, all of the sensor data signals S1 to Sk are 8-bit digital signals. If the sensor 31a is a CCD line sensor having 5,000 pixels, the data signal S1 indicates pixel data indicated with 8 bits, and "n" is 4999.

Figure 5:
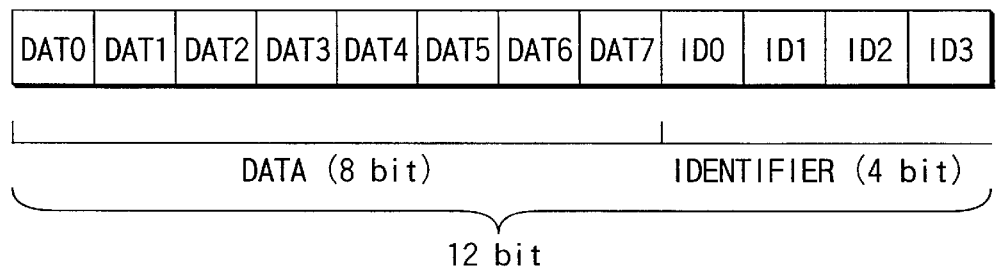
FIG. 5 is a diagram showing the structure of output data.

As shown in FIG. 5, the FIFO memories 91 add a 4-bit identifier indicating the sensor from which the 8-bit data has been obtained to data above so as to generate output data in 12 bit units. The identifiers are given intrinsic values for the FIFO memories 91. Twelve-bit output data OD generated by the FIFO memories 91 is output from the output control circuit 11 to respond to the reference clocks RC having frequencies higher than the clocks for the A/D converters 7. Output data OD is sequentially output to the 12-bit data bus 10.

As described above, the signals supplied from the sensors are converted into the digital signals by the A/D converter so as to be supplied to the FIFO memories at the periods of the clocks of the A/D conversion. The FIFO memories sequentially store the input signals and output stored data at the periods of the reference clock RC having the frequency higher than that of the sensor clocks C1 to Ck from the sensors. As described above, the mixer 8 adds the identifier indicating the sensor portion from which data has been obtained to data obtained from the plural sensor portions. Then, the mixer 8 sequentially and collectively outputs data for each sensor portion.

As a result, data is output at the rate higher than the transmission rate of each data signal input to the FIFO memories. Thus, efficient transmission of data can be performed.

Although the foregoing embodiment is structured such that the data bus 10 has a size of 12 bits in which the width of data uses 8 bits and the identifier uses 4 bits, the width of data and that of identifier must sufficiently be large in consideration of the resolution of the A/D converter and the number of the sensors.

The structure of the detection-result processing unit 12 will now be described.

Figure 6:
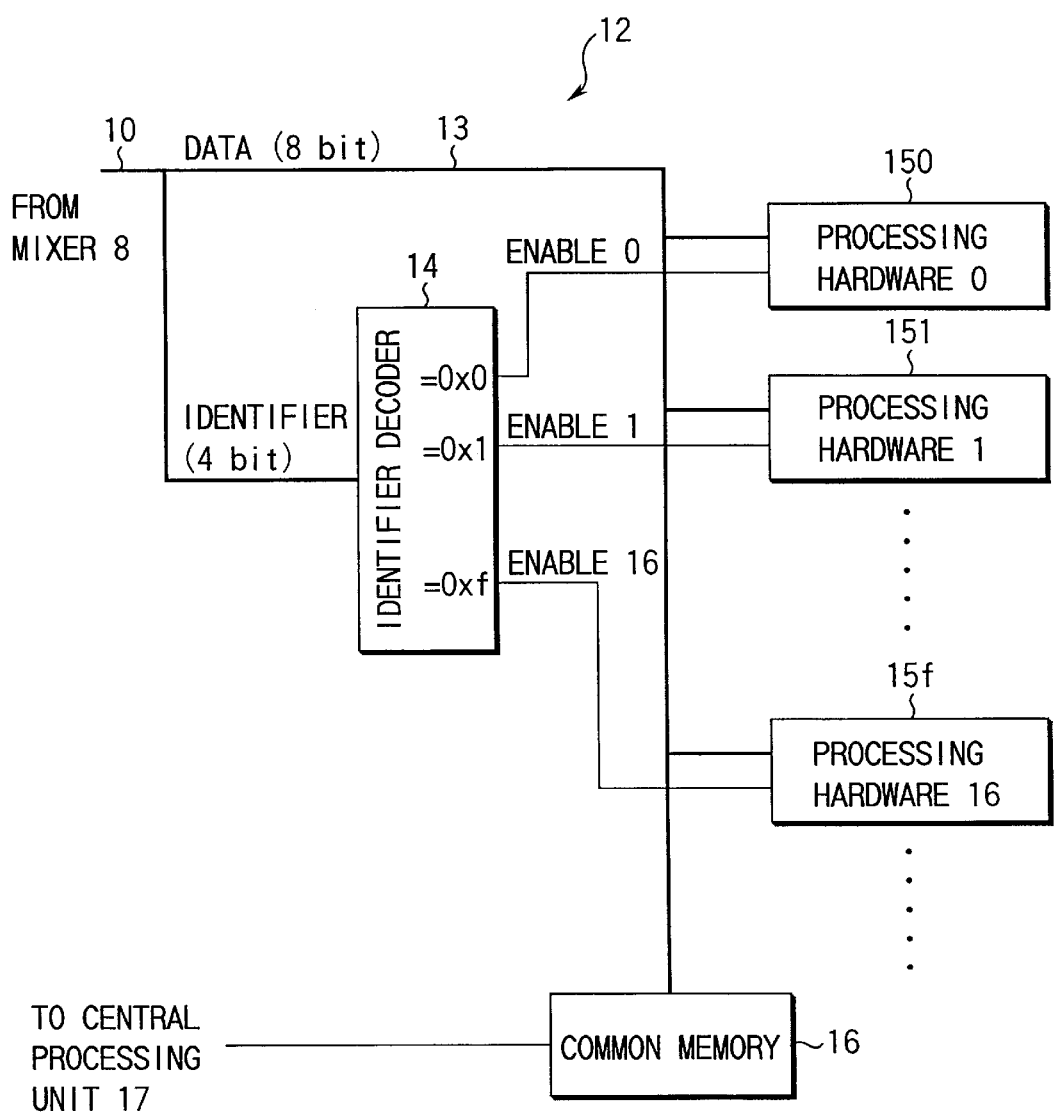
FIG. 6 is a block diagram showing the structures of detection-result processing units.

FIG. 6 is a diagram showing an example of the structure of the detection-result processing unit 12. That is, the detection-result processing unit 12 is input with 12-bit data output from the mixer 8 to the data bus 10. Input data includes data using the data width of 8 bits and the identifier using the data width of 4 bits. The detection-result processing unit 12 incorporates an identifier decoder 14, processing hardware 150, 151, ..., 15f and a common memory 16.

The identifier decoder 14 decodes input identifier using four bits to select the processing hardware corresponding to the identifier. That is, the identifier decoder 14 outputs the enable signals (enable 0 to enable 16) as a result of decoding of the identifier to select the processing hardware.

Each processing hardware 150 inputs data on an 8-bit data line 13 when the processing hardware 150 has received the enable signal from the identifier decoder 14. The processing hardware 150 performs a process for detecting whether or not input 8-bit data contains, for example, a predetermined data pattern so as to output a result of the detection. Although the number of the processing hardware is 16 in this embodiment, the number is not limited to the foregoing number. The number of the processing hardware is determined to correspond to the types to be subjected to the detecting process.

The common memory 16 stores the result of the detection supplied from the processing hardware 150. Data stored in the common memory 16 is read and processed by the central processing unit 17.

As described above, the mixer 8 adds the identifier to the signal supplied from each sensor to convert the signal into serial data having a predetermined bit width so as to output the serial data. The detection-result processing unit 12 subjects data supplied from the mixer 8 to the detection process so as to provide results of the detection.

As a result, the signals supplied from the plural sensor portions 31 are processed by one detection-result processing unit 12 so that the plural physical characteristics of the objects to be detected are detected. Therefore, the number of the transmission passages in the detecting apparatus, and more particularly the number of the transmission passages in the processing unit 5 can be reduced. Hence it follows that the structure of the detecting apparatus can be simplified.

The example shown in FIG. 2 has the structure that the detecting process is performed by one detection-result processing unit 12. An example in which a plurality of detection-result processing means each having a similar structure are provided to perform the detection process will now be described with reference to FIG. 7. The same elements as those shown in FIG. 2 are given the same reference numerals and the same elements are omitted from description.

Figure 7:
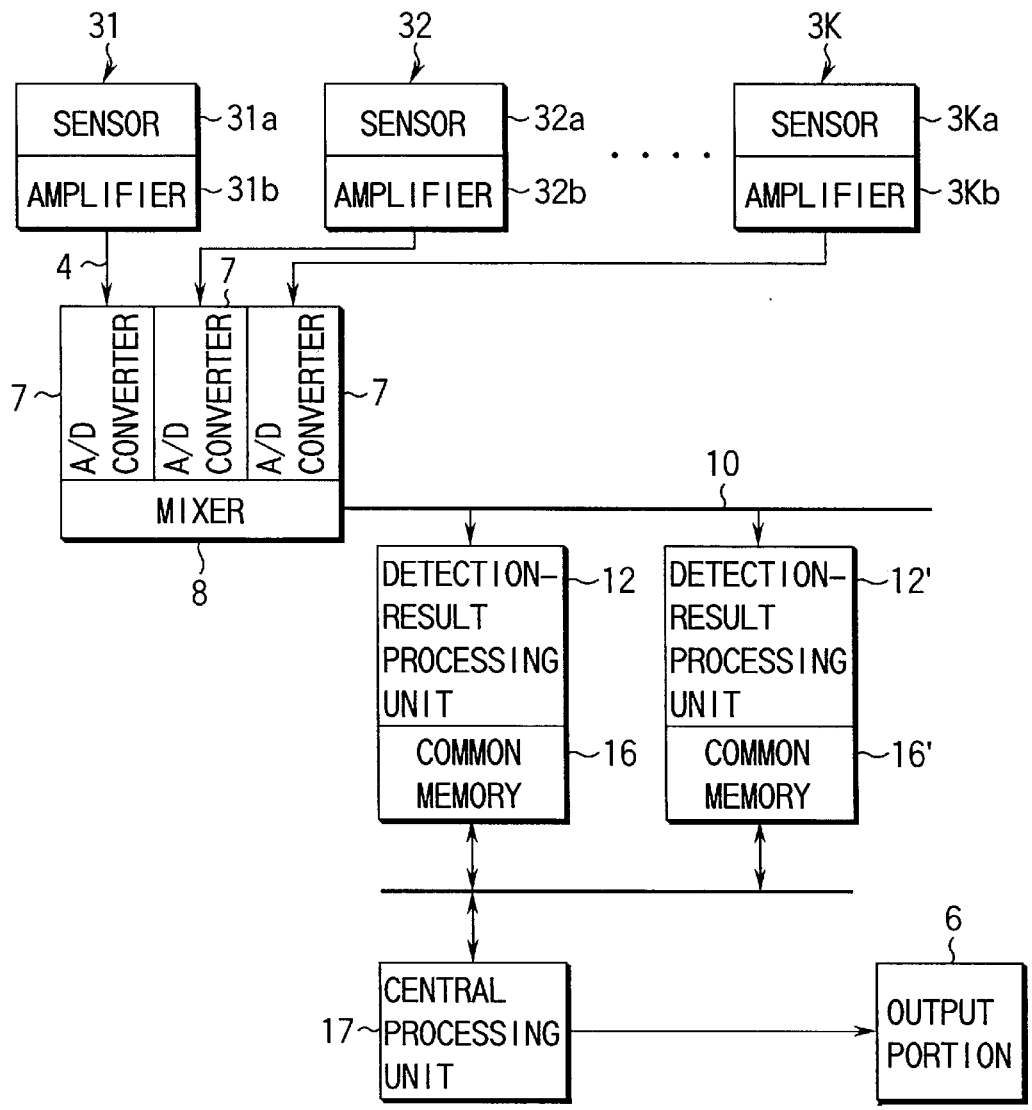
FIG. 7 is a block diagram showing examples of the structures of sensor portions and processing units of the detecting apparatus.

When data to which the identifier has been added and which has a predetermined width has sequentially been output from the mixer 8 to the data bus 10 as shown in FIG. 7, either of the detection-result processing unit 12 or the detection-result processing unit 12' receives data to perform the detection process.

For example, the detection-result processing unit 12 and 12' process data to which different identifiers have been added. Thus, the data having the same identifier is processed by the same detection-result processing unit. Therefore, the rate of the detecting process is doubled. Alternatively, if either detection-result processing means encounters a problem, the other detection-result processing unit performs the detecting process of data output to the data bus 10.

Therefore, if either of the detection-result processing means has a problem or the detection-result processing means is processing data, data obtained by the sensor can quickly be processed. As a result, the processing efficiency of the detecting apparatus can be improved and countermeasures against the problem can quickly be taken.

Figure 8:
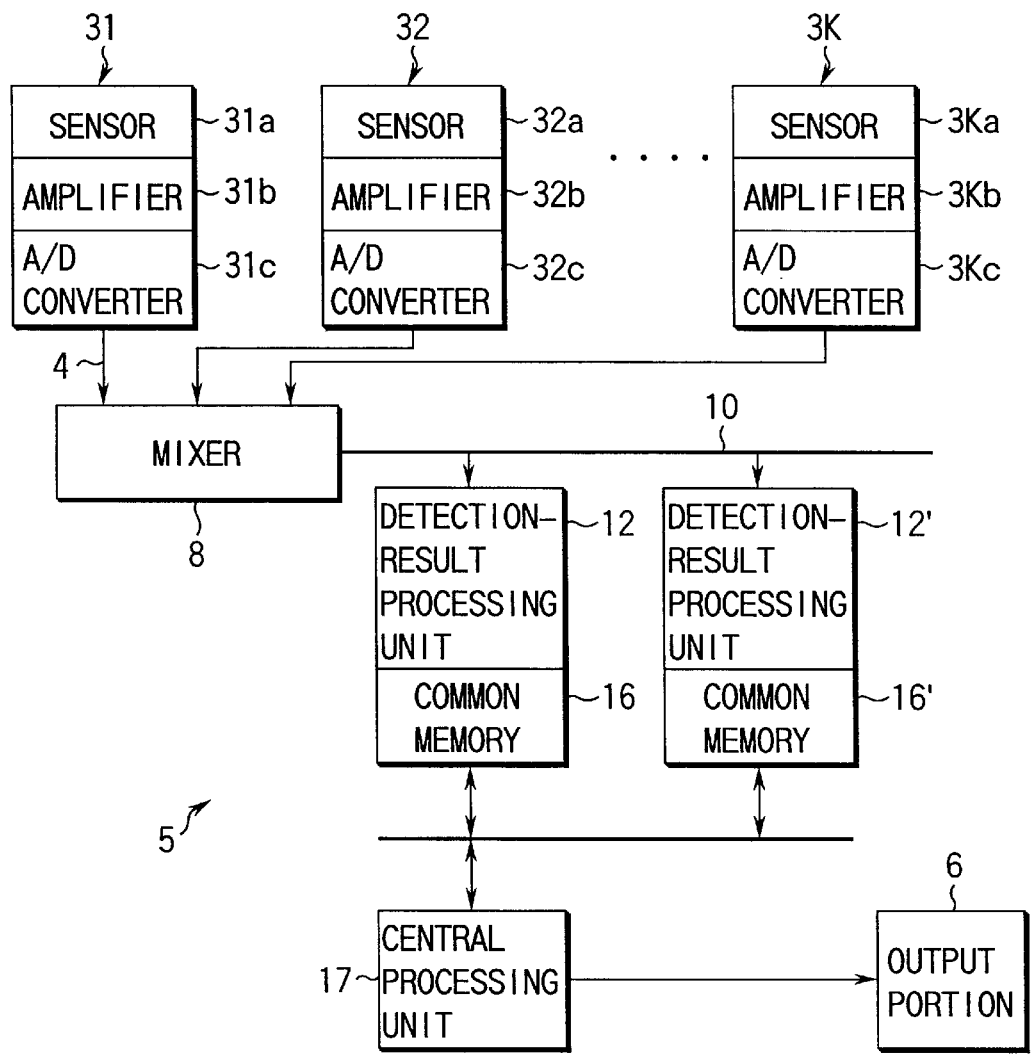
FIG. 8 is a block diagram showing examples of the structures of sensor portions and processing units of the detecting apparatus.

FIG. 8 is a diagram showing an example of the structure of the detecting apparatus arranged such that analog signals supplied from the sensors are converted into digital signals by the sensor portions 31 so as to transmit signals to the processing unit 5. The same elements as those shown in FIGS. 2 and 7 are given the same reference numerals and the same elements are omitted from the description.

As shown in FIG. 8, the physical characteristics of the objects to be detected, which are being conveyed on the conveyance passage, are detected by the sensors 31a of the sensor portions 31 so as to be converted into analog electric signals. Then, the sensor portions 31 cause amplifiers 31b to amplify the analog electric signals supplied from the sensors 31a and A/D converters 31c to convert the amplified signals into digital signals.

Data converted into the digital signals are, for each of the sensor portions 31, transmitted to the processing unit 5 through the transmission passages 4. The mixer 8 of the processing unit 5 receives data converted into digital data and supplied from the sensor portions 31. Each transmission passages 4 transmits, for example, 8-bit parallel data.

The detecting apparatus having the above-mentioned structure is arranged to convert the signals indicating the physical characteristics detected by the sensor portions into digital signals and transmit the digital signals to the processing unit. As a result, the digital signals are transmitted through the transmission passages even if the transmission passages connecting a sensor portion and a processing unit are long. Therefore, the problem of attenuation of the electric signal detected by the sensor portion and reduction in the S/N ratio can be prevented. As a result, a reliable detection process can be performed.

An example of the structure of the detecting apparatus arranged such that the sensor portions 31 convert analog signals into digital signals and convert the digital signals into serial data so as to output the serial data to the processing unit 5 will now be described with reference to FIG. 9. The same elements as those shown in FIGS. 2 and 8 are given the same reference numerals and the same elements are omitted from description.

Figure 9:
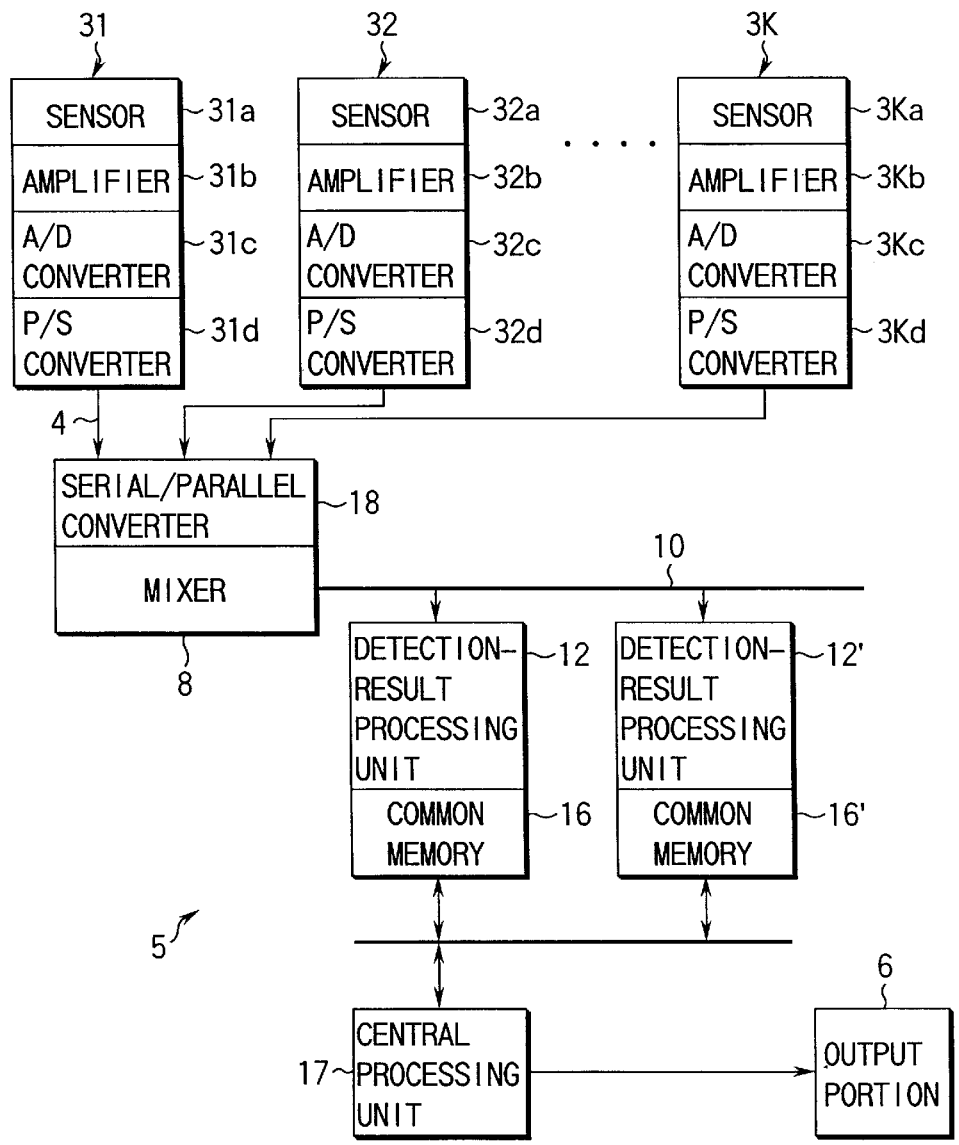
FIG. 9 is a block diagram showing examples of the structures of sensor portions and processing units of the detecting apparatus.

That is, the various physical characteristics of the objects to be detected, which are being conveyed on the conveyance passage 2 are, as shown in FIG. 9, converted into analog electric signals by the sensors 31a of the sensor portions 31. The analog electric signals are amplified by the amplifiers 31b, and then converted into digital signal data by the A/D converters 31c.

Data converted into the digital signals are converted from parallel data into serial data by the parallel/serial converters (P/S converters) 31d in accordance with the conversion rate of each of the A/D converters 31c. Then, serial data is transmitted to the processing unit 5 through the transmission passages 4 serving as a serial bus. Therefore, also digital data is transmitted to the transmission passages 4.

In the processing unit 5, serial data transmitted from the sensor portions 31 through the transmission passages 4 is input to a serial/parallel converter (a S/P converter) 18. The serial/parallel converter 18 converts serial data transmitted from the sensor portion through the transmission passages 4 into parallel data. Parallel data converted by the serial/parallel converter 18 is input to the mixer 8.

The detecting apparatus having the above-mentioned structure is arranged such that the signals obtained by the sensor portions and indicating the physical characteristics are converted into digital signals, followed by converting parallel data into serial data so as to be transmitted to the processing unit.

As a result, the signals transmitted from the sensor portions through the long transmission passages are converted into digital signals. Moreover, digital and parallel data is converted into serial data so as to be transmitted. Thus, the number of the transmission passages (signal lines) can be reduced and, therefore, the transmission passages can be simplified. Moreover, deviation (skew) between bits which sometimes occurs when parallel and digital data is transmitted through long transmission passages can be prevented.

Figure 10:
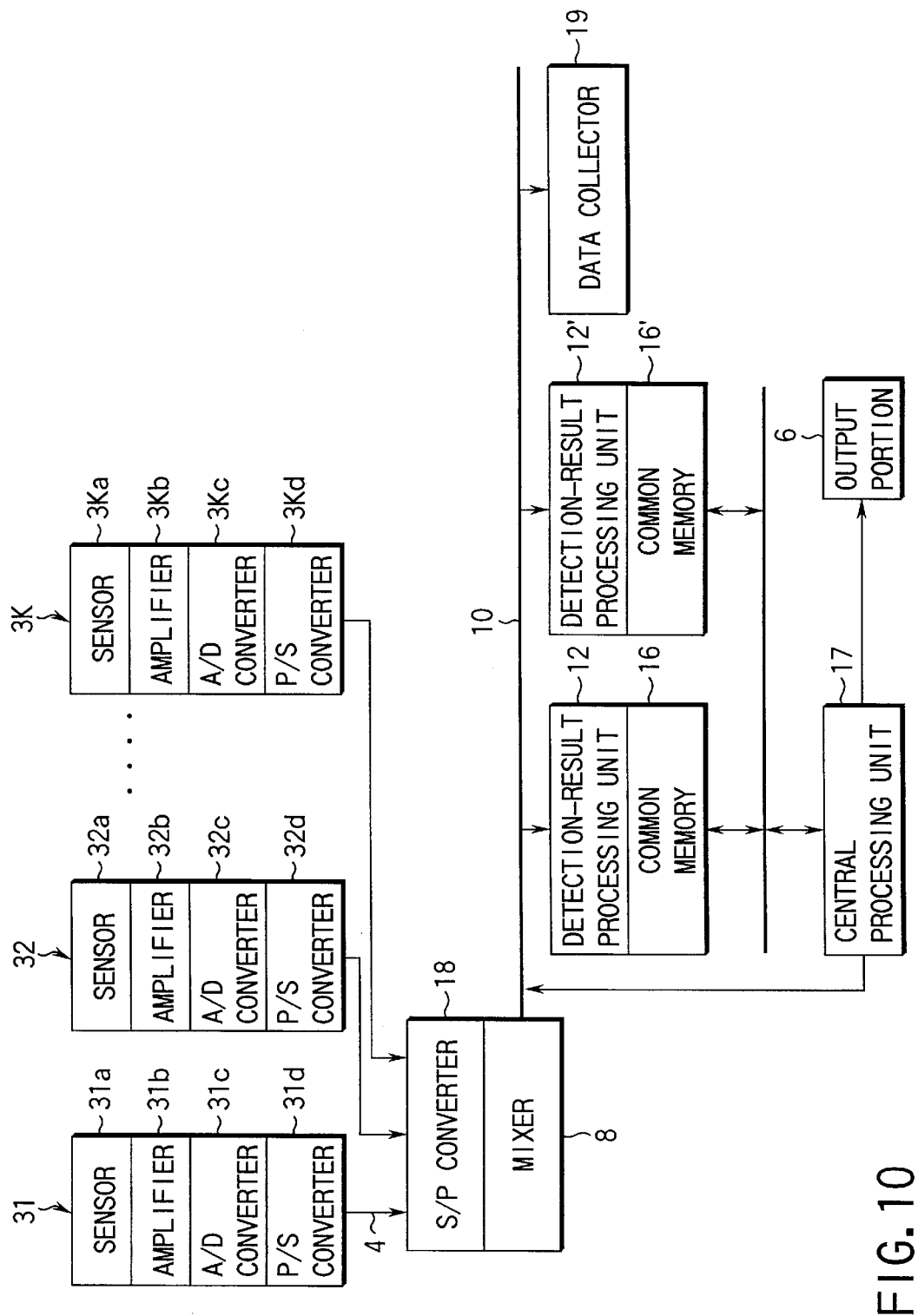
FIG. 10 is a block diagram showing examples of the structures of sensor portions and processing units of the detecting apparatus.

FIG. 10 is a diagram showing an example of the structure of the detecting apparatus provided with a data collector for collecting information indicating various physical characteristics detected by the sensor portions. The same elements as those shown in FIGS. 2 and 9 are given the same reference numerals and the same elements are omitted from description.

As shown in FIG. 10, the detection-result processing unit 12 and a data collector 19 are connected to the data bus 10 to which output data is supplied from the mixer 8. Data output from the mixer 8 to the data bus 10 is input to the detection-result processing unit 12 and the data collector 19.

The data collector 19 directly inputs data transmitted from the mixer 8 to a recording area in the data collector 19 so as to collect data. Collected data is given the identifier and the serial number of each of the objects to be detected, which have been output to the data bus 10 together with data.

Figure 11:
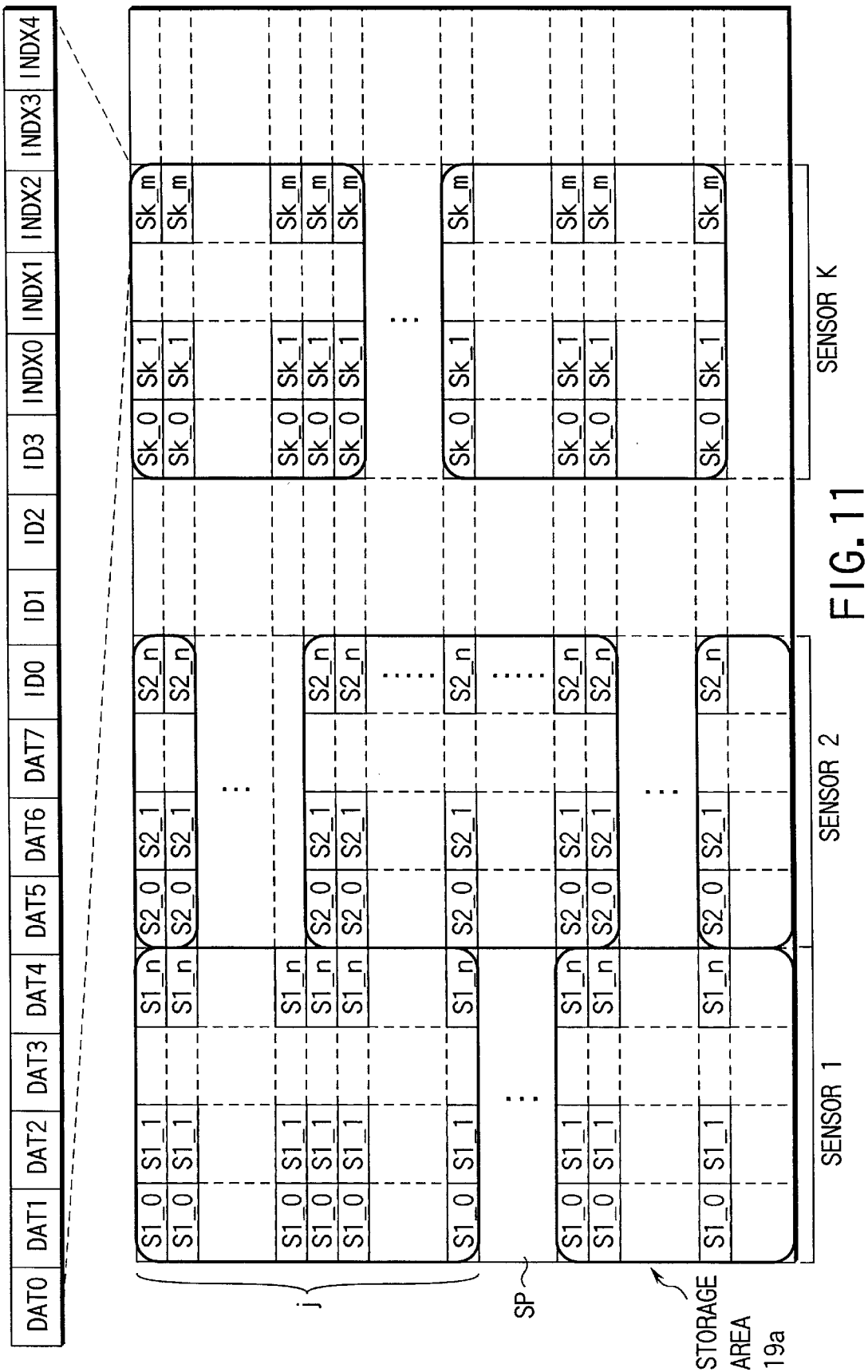
FIG. 11 is a diagram showing the structure of data collected by a data collector.

FIG. 11 is a diagram showing an example of data collected in the recording area 19a in the data collector 19. FIG.

11 shows an example that the number of the sensor portions provided for the detecting apparatus is k (S1 to Sk), the number of data items on one line of each of the sensor 1 and the sensor 2 is n+1 (0 to n), the number of data items on one line of the sensor k is m+1 (0 to m), the number of lines for collected data about each of objects to be detected by each sensor is j, the number of the objects to be detected and placed on the conveyance passage is i, the width of data is 8 bits, the size of the identifier (ID) of the sensor is 4 bits and that of index information (INDX) indicating the serial number of each of the objects to be detected is 5 bits.

That is, the data collector 19 is supplied with output data for each line from the mixer 8 in the order indicated as output data OD shown in FIG. 4. Therefore, collected data is stored in the above-mentioned order. Each data is, as shown in FIG. 5, formatted to use 8 bits for the width of data and 4 bits for the width of the identifier so as to be collected by the data collector 19. Data which is collected by the data collector 19 is given index information of each of the objects to be detected in addition to the identifier shown in FIG. 5.

Index information of the objects to be detected is arranged such that, for example, "0" is assigned when the operation of the detecting apparatus is started and the index information indicates the serial number of the objects to be detected, which are sequentially conveyed on the conveyance passage 2. The index information is supplied from the central processing unit 17. Since the sensor portions 31 are interspersed over the conveyance passage 2 as described with reference to FIG. 1, data of the same object to be detected is input from the plurality of sensors at different timing. Therefore, the object to be detected from which data has been obtained cannot be identified by using only the identifier. Since the foregoing index information is given, the object to be detected from which data stored in the data collector 19 has been obtained can be identified.

Referring to FIG. 11, each of data groups enclosed by thick lines is data about the same object to be detected. Each object to be detected is sequentially detected in the order of the sensor 1, the sensor 2, . . . , the sensor k. For example, the sensor 1 supplies data for one line of S1_0 to S1_n in a quantity of j lines for each object to be detected. The sensor 1 detects space SP between objects to be detected to transmit an SP signal to the central processing unit 17. In response to the SP signal, the central processing unit 17 generates index information to output index information to four lower bits in the data bus 10.

In the detecting apparatus structured as described above, data output from the mixer to the data bus is received by the detection-result processing unit. The data collector also receives data. The data collector collects data for each of the objects to be detected. Thus, data indicating the various physical characteristics of each of the objects to be detected can easily be collected.

Figure 12:
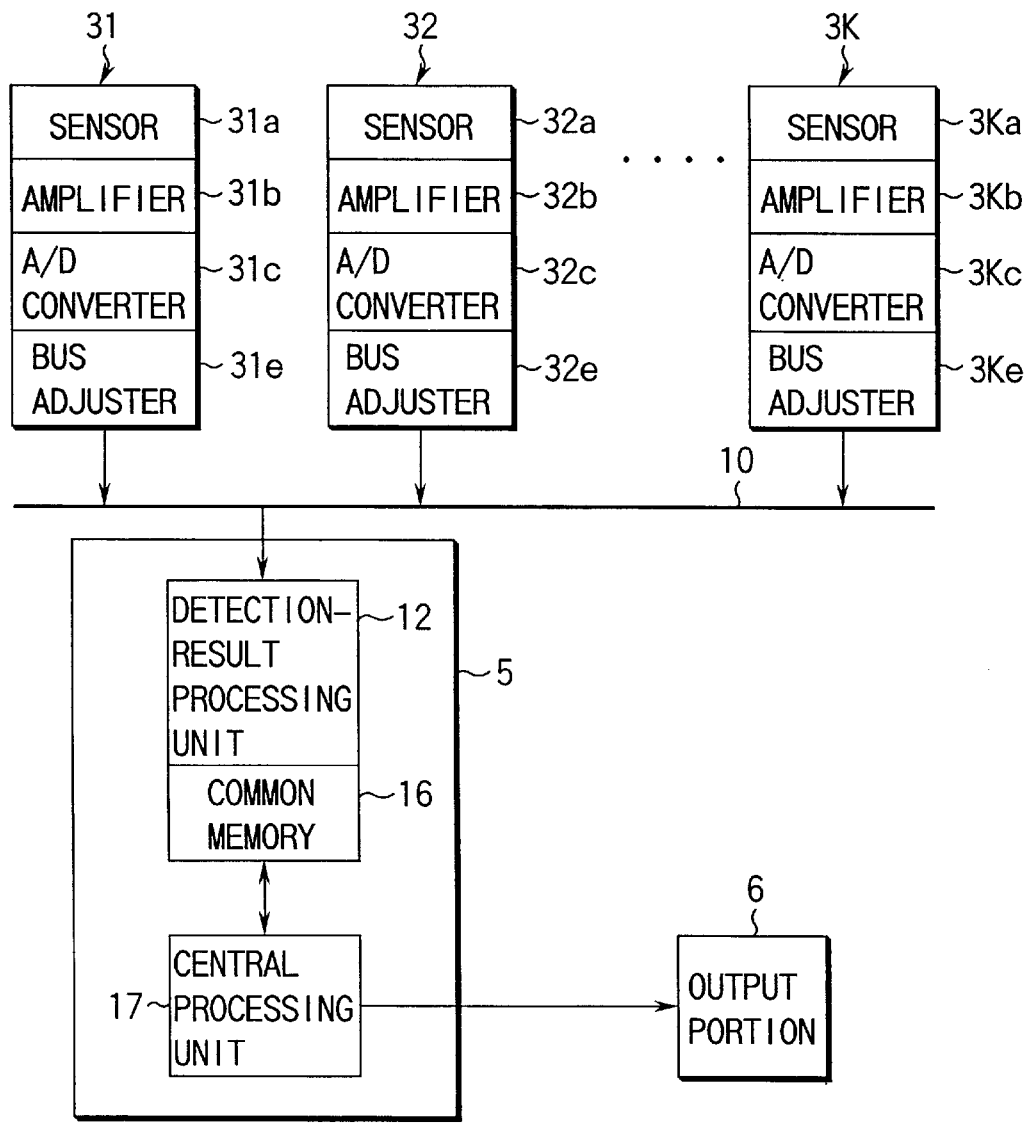
FIG. 12 is a block diagram showing examples of the structures of the sensor portions and processing units of the detecting apparatus.

FIG. 12 is a diagram showing an example of the structure of the detecting apparatus arranged to cause bus mediators to control the output of data detected by the sensor portions and converted into the digital signals to output data to the data bus 10. The same elements as those shown in FIG. 2 are given the same reference numerals and the same elements are omitted from description.

As shown in FIG. 12, each of the sensor portions 31 incorporates a sensor 31a, an amplifier 31b, an A/D converter 31c and a bus mediator 31e. Each of the sensor portions 31 is connected to the processing unit 5 through the data bus 10. The processing unit 5 incorporates a detection-result processing unit 12, a common memory 16 and a central processing unit 17.

In the sensor portions 31, the physical characteristics of the objects to be detected, which are being conveyed on the conveyance passage 2, are converted into analog electric signals by the sensors 31a. The analog electric signals are amplified by the amplifiers 31b, and then converted into digital signals by the A/D converters 31c. The output of data converted into the digital signal is controlled by each of the bus mediators 31e so as to be output to the data bus 10.

As shown in FIG. 5, each of the bus mediators 31e adds an identifier indicating the sensor from which data has been obtained and which has a predetermined width to data indicating the physical characteristics and converted into the digital signal so as to output data with the identifier. At this time, each of the bus mediators 31e outputs data to the data bus 10 in synchronization with a predetermined timing signal defined in accordance with the horizontal synchronizing signal and the reference clock.

Figure 13:
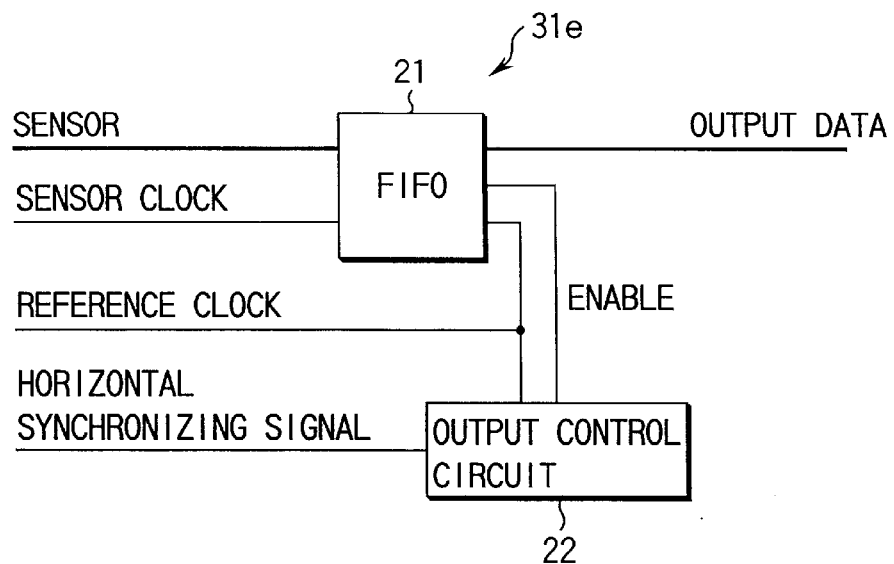
FIG. 13 is a block diagram showing an example of the structure of a circuit in a bus mediator.

FIG. 13 is a diagram showing an example of a circuit in each of the bus mediators 31e. As shown in FIG. 13, the foregoing circuit incorporates a FIFO memory 21 and an output control circuit 22. As described above, the FIFO memory 21 is supplied with the digital signal corresponding to the analog electric signal supplied from each of the sensors 31a at the sensor clock period (that is, the conversion period of the A/D converter 31c). In response to the input horizontal synchronizing signal and the reference clock, the output control circuit 22 generates an enable signal (ENABLE) to supply the enable signal to the FIFO memory 21. During a period in which the FIFO memory 21 is receiving the enable signal (for example, a high-level signal) from the output control circuit 22, the FIFO memory 21 outputs stored data to the data bus 10 in synchronization with the reference clock supplied from the central processing unit 17. Note that the output from the FIFO memory 21 includes the 4-bit identifier shown in FIG. 5. The foregoing identifier is also output to the data bus 10 in response to the enable signal.

In the example of the circuit, the output control circuit 22 incorporates a counter circuit to which the horizontal synchronizing signal and the reference clock are input. The counter is reset in response to the horizontal synchronizing signal and arranged to perform counting in response to the reference clock. The enable signals are output to the FIFO memory 21 in a period from a certain count to another certain count.

Figure 14:
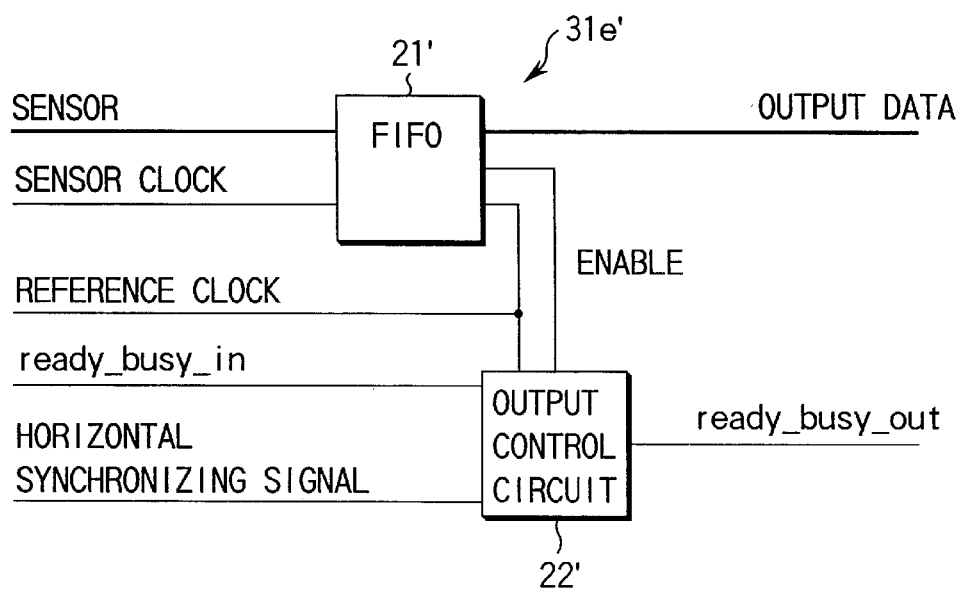
FIG. 14 is a block diagram showing another example of the structure of a circuit in the bus mediator.

FIG. 14 is a diagram showing another example of a circuit in each of the bus mediators 31e. In the example of the circuit shown in FIG. 14, output control circuits 22' of the bus mediators 31e' are connected to one another through a daisy chain. A ready-busy signal is communicated between the output control circuits 22'. The output control circuit 22' to which the ready signal has been input outputs, to the FIFO memory 21', the enable signal which permits output of data from the FIFO memory 21'.

That is, when the ready signal has been input to the output control circuit 22', the output control circuit 22' outputs the enable signal (ENABLE) to the FIFO memory 21' to cause data to be output from the FIFO memory 21'. After the predetermined number of data items have been output, output of data from the FIFO memory 21' is disabled. Moreover, the ready signal is output to a following output control circuit connected through the daisy chain. Time for which the enable signals are output from the sensor portions will now be described with reference to an example shown in FIG. 4. The time is same as the time for which output data OD (0 to n or 0 to m) from the sensors (the sensor 1 to sensor k) is output. As a result, data items from the sensors are sequentially output to the data bus so as to be processed by the detection-result processing unit. Note that the output from the FIFO memory 21 also contains the 4-bit identifier shown in FIG. 5. The identifier is also output to the data bus 10 in response to the foregoing enable signal.

The digital signals input to the FIFO memories 21 and 21' are temporarily stored in the FIFO memories at the periods of the A/D conversion clocks of the A/D converters. The FIFO memories output data at the period of the reference clock, the rate of which is higher than that of the A/D conversion clock. As a result, data obtained by each sensor can efficiently be transmitted.

Figure 15:
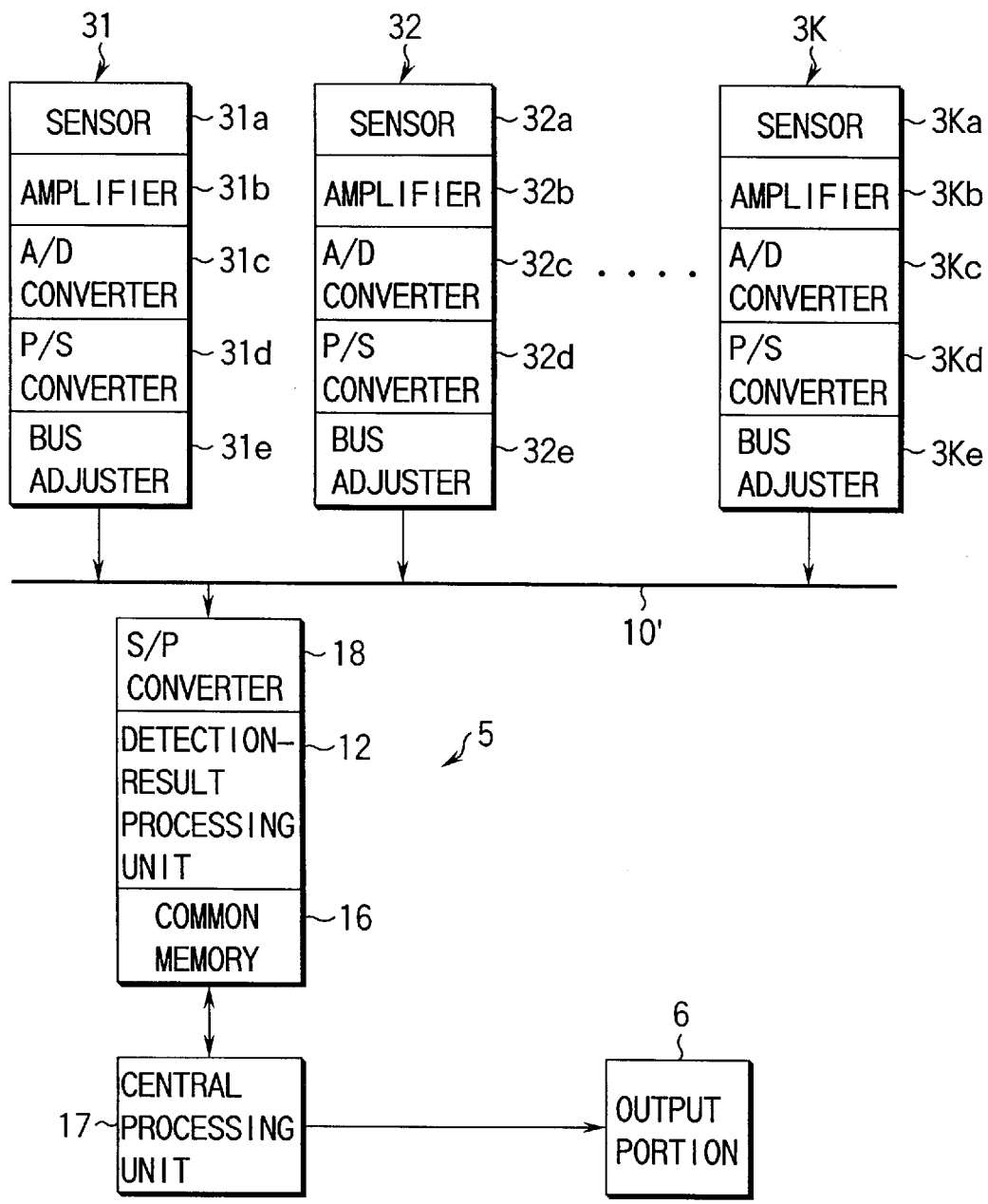
FIG. 15 is a block diagram showing examples of the structures of the sensor portions and processing units of the detecting apparatus.

FIG. 15 is a diagram showing an example of the structure of the detecting apparatus arranged to convert data converted into the digital signal by the sensor portions into serial data and then output is controlled by the bus mediator so as to output data to the data bus 10. Note that the same elements as those shown in FIGS. 2 and 12 are given the same reference numerals and the same elements are omitted from description.

As shown in FIG. 15, the foregoing detecting apparatus incorporates the sensor portions 31 each of which is structured such that each of parallel/serial converters 31d is disposed between each of the A/D converters 31c and each of the bus mediators 31e.

In each of the sensor portions, the physical characteristics of the objects to be detected, which are being conveyed on the conveyance passage 2, are converted into analog electric signals by the sensors 31a, and then amplified by the amplifiers 31b. Then, the amplified signals are converted into digital signals composed of parallel data by the A/D converters 31c. The digital signals composed of parallel data are converted into serial data by the parallel/serial converters 31d so as to be transmitted to the bus mediators 31e. The bus mediators 31e add identifiers for a predetermined data length to data converted into the serial data by the parallel/serial converters 31d. Then, the bus mediators 31e output data with the identifiers to the data bus 10' in synchronization with a timing signal generated from the synchronizing signal and the reference clock.

When data on the data bus 10' has been input to the processing unit 5, the serial/parallel converter 18 converts serial data into parallel data so as to transmit the parallel data to the detection-result processing unit 12.

The detecting apparatus structured as described above is arranged to convert parallel digital signals obtained by the sensor portions into serial data and then output serial data to the serial data bus.

As a result, the serial bus can be used as the transmission passage for connecting the sensor portion and the processing unit. As a result, the problems experienced with the structure in which the parallel bus is employed in that the layout of the bus becomes too complicated and skew occurs for each bit can be overcome.

Figure 16:
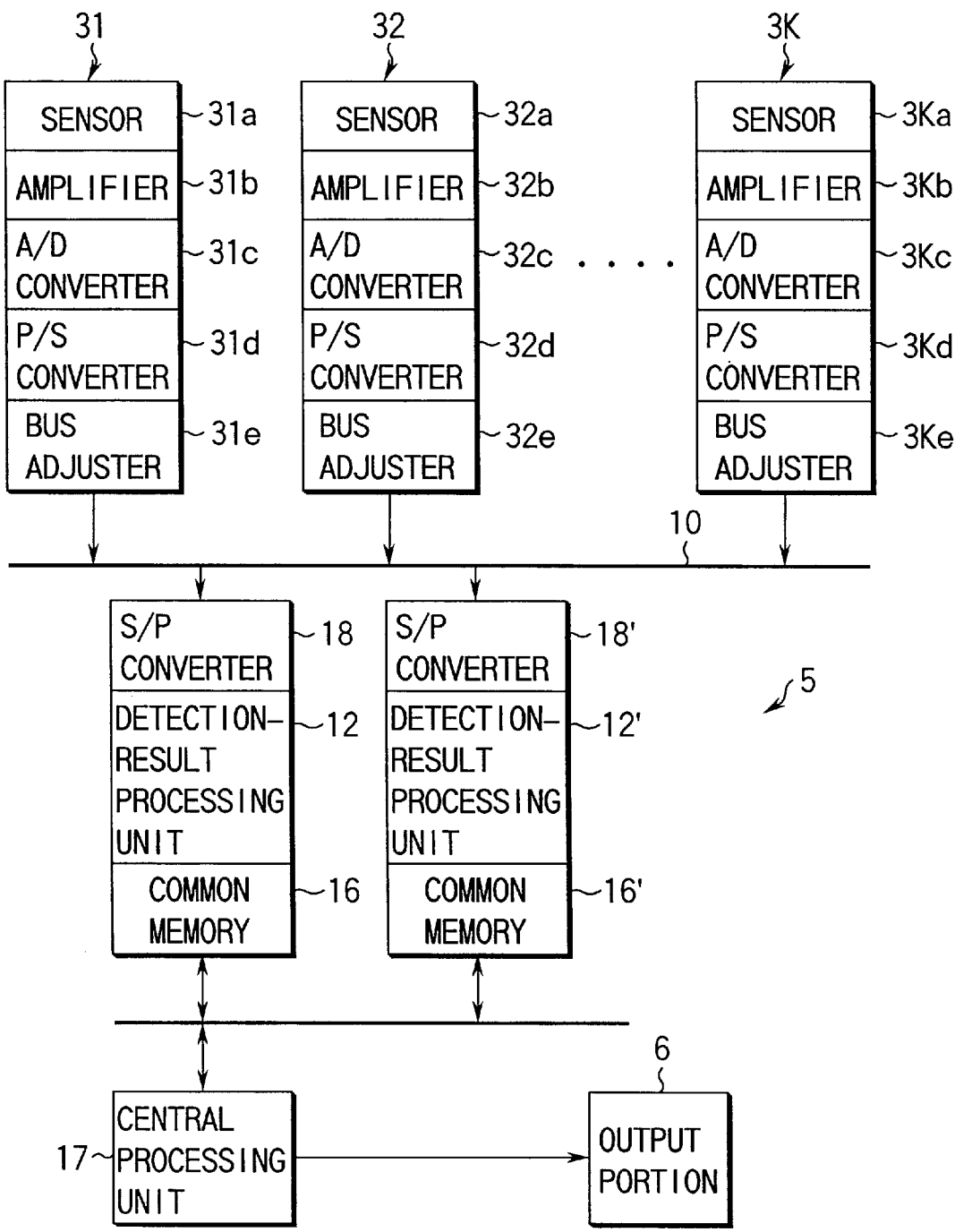
FIG. 16 is a block diagram showing examples of the structures of the sensor portions and processing units of the detecting apparatus.

A structure in which the detecting apparatus incorporates a plurality of the detection-result processing units will now be described. FIG. 15 shows the structure incorporating one detection-result processing unit. FIG. 16 is a diagram showing the structure that a plurality of the detection-result processing units having the same structure are provided. Note that the same elements as those shown in FIGS. 2 and 15 are given the same reference numerals and the same elements are omitted from description.

In the foregoing case, when either of the detection-result processing units has a problem or when either of the detection-result processing unit is performing a process, the other detection-result processing unit can perform the detection process. Therefore, the process can quickly be performed. As a result, the processing efficiency of the detecting apparatus can be improved and countermeasures against a problem can quickly be taken.

Figure 17:
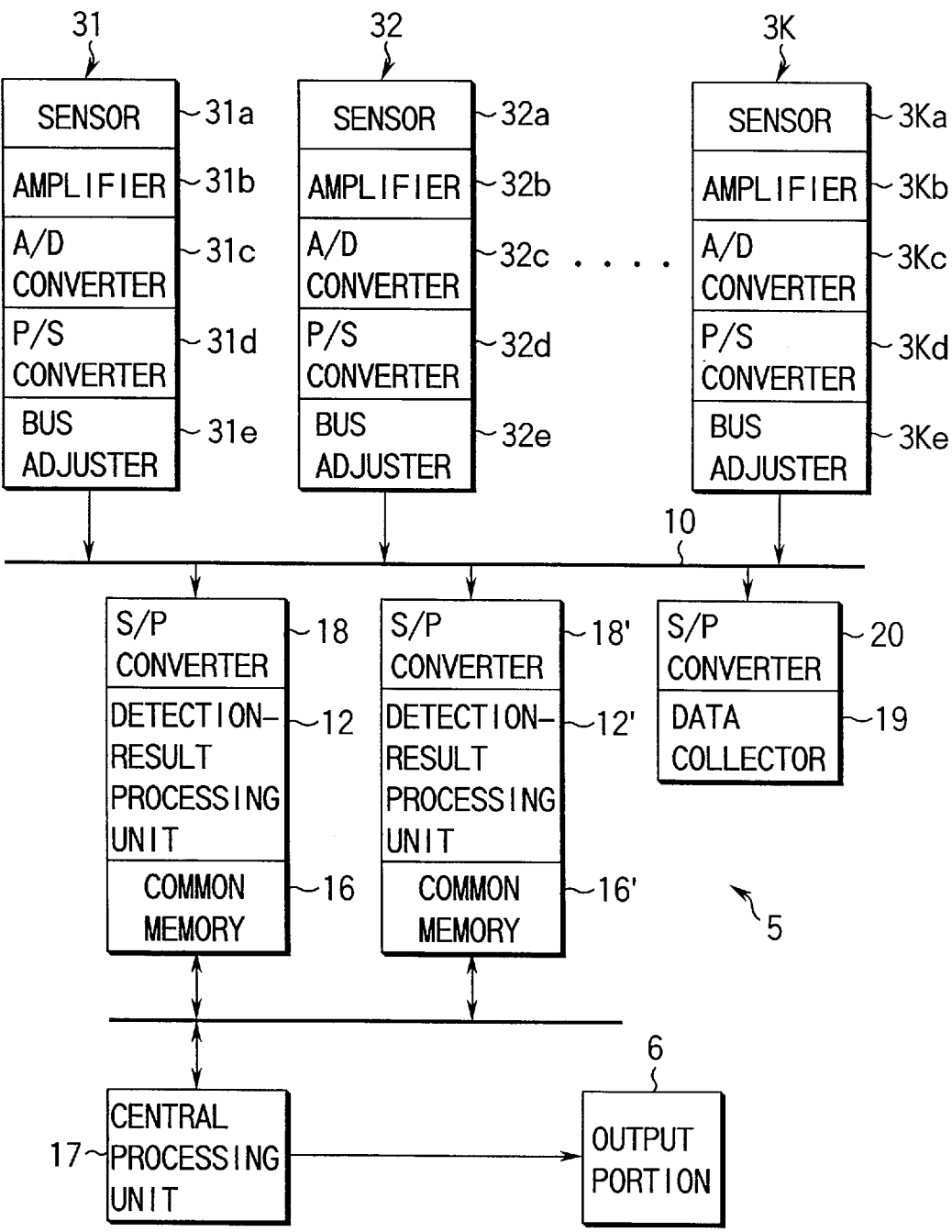
FIG. 17 is a block diagram showing examples of the structures of the sensor portions and processing units of the detecting apparatus.
Figure 18:
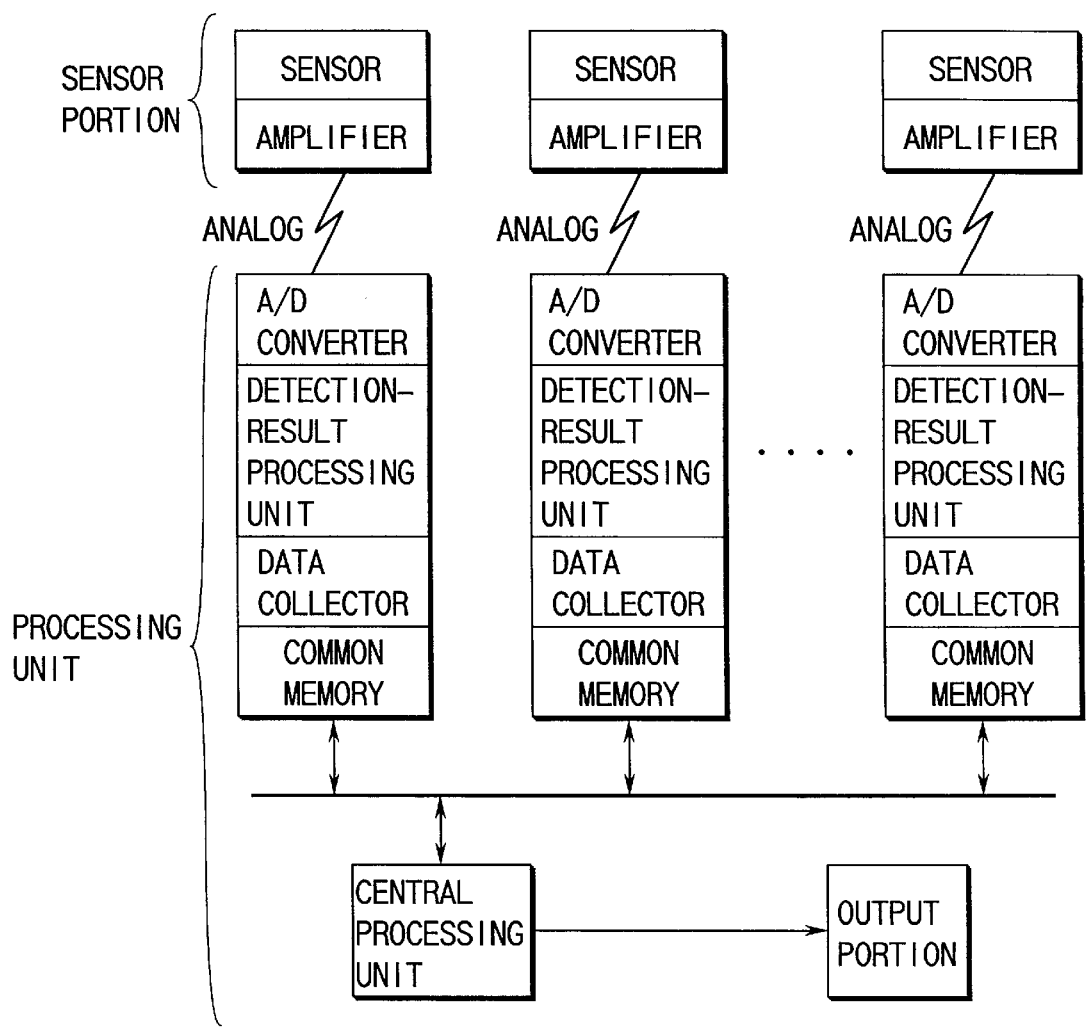
FIG. 18 is a block diagram showing examples of the structures of the sensor portions and processing units of the conventional detecting apparatus.

FIG. 17 is a diagram showing an example of the structure of the detecting apparatus which incorporates a data collector for collecting data of each object to be detected, indicating the various physical characteristics of the objects to be detected, which have been obtained by the sensor portions. Note that the same elements as those shown in FIGS. 2 and 15 are given the same reference numerals and the same elements are omitted from description.

As shown in FIG. 17, data output to the data bus 10' is input to the processing unit 5 and the data collector 19.

The data collector 19 causes a serial/parallel converter 20 to receive serial data output to the data bus 10' serving as the transmission passage. As shown in FIG. 10, the data collector 19 writes, in a storage area 19a, data formed by adding index information intrinsic to the object to be detected to data containing the identifier intrinsic to the sensor portion.

The detecting apparatus structured as described above causes the detection-result processing units to receive data output to the data bus. The data collector also receives data so that the data collector collects data for each of the objects to be detected. As a result, the various physical characteristics for each of the objects to be detected can easily be collected.

The structure shown in FIG. 17 is arranged such that the parallel/serial converter in each of the sensor portions converts data into serial data. Then, serial data is output to the transmission passage. Then, the serial/parallel converter disposed immediately before the data collector converts data into parallel data. The present invention is not limited to the foregoing structure. If the distance between the sensor portion and the processing unit is short and layout of the data bus serving as the transmission passage and the skew for each bit become negligible, a detecting apparatus can be provided with which similar effects can be obtained in a case of a structure from which the parallel/serial converter and the serial/parallel converter are omitted.

As described above, according to the present invention, the transmission passage among the plural sensor portions and the processing unit and the transmission passage in the processing unit can be simplified.

The processing hardwares for processing the electric signals supplied from the sensor portions can be made to be common to simplify the structure of the processing unit.

A variety of data items about the objects, detected by the sensors can easily be collected by providing only one data collector.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A detecting apparatus comprising:
   a conveyor constructed and arranged to sequentially conveying a plurality of to-bedetected objects;
   sensor groups positioned at different places on the conveyor and outputting analog data indicative of physical characteristics obtained from to-be-detected objects being conveyed, the sensor groups being of different types for detecting respective different physical characteristics;

a plurality of converters each converting the analog data input from a corresponding sensor group to digital data having a predetermined number of bits in accordance with a corresponding one of first clocks;

a plurality of memory sections each adding to the digital data input from a corresponding one of the converters an identifier that indicates one of the sensor groups which corresponds to the corresponding one of the converters, and thereby storing the digital data;

an output circuit sequentially outputting data obtained by each of the sensor groups and stored in each of the memory sections, via a common signal line in accordance with a second clock which has a higher frequency than the first clocks;

detecting means having a plurality of processing hardware units for outputting a detection result of detecting the to-be-detected objects with respect to the physical characteristics, and detecting the data output from the output circuit by use of one of the processing hardware units that conducts detection for a physical characteristic corresponding to one of the sensor groups identified by the identifier; and outputting means for analyzing the detection result obtained from each of the to-be-detected objects by the detection means, and thereby outputting an instruction for a predetermined operation.

2. A detecting apparatus according to claim 1, wherein each of the sensor groups outputs the analog data on the corresponding one of the physical characteristics in units of one scanning line;

each of the memory sections adds to the digital data the identifier indicating one of the sensor groups corresponding to one of the converters that converts the analogue data to the digital data, and thereby stores the digital data in units of one scanning line; and the output circuit sequentially outputs the digital data of each of the sensor groups in units of one scanning line.

3. A detecting apparatus according to claim 1, wherein the first clocks of the converters are asynchronous with one another.

4. A detecting apparatus according to claim 1 wherein the detecting means has the plurality of processing hardware units and conducts a plurality of detection operations on each of the to-be-detected objects; and the outputting means analyzes a plurality of detection results obtained from each of the to-be-detected objects by the detecting means and thereby outputs the instruction for the predetermined operation.

5. A detecting apparatus according to claim 1, wherein the converters output the digital data as serial data;

the memory sections store the serial data; and the stored serial data is read out as parallel data.

* * * * *